United States Patent [19]
Saito et al.

[11] 3,947,892
[45] Mar. 30, 1976

[54] HELICAL SCAN TYPE TAPE CASSETTE HAVING TAPE THREADING MEANS

[75] Inventors: Teruo Saito; Hideki Seki; Mamoru Hiroyasu, all of Saijo, Japan

[73] Assignee: Matsushita Electric Industrial Company, Ltd., Osaka, Japan

[22] Filed: May 29, 1974

[21] Appl. No.: 474,347

[30] Foreign Application Priority Data

May 30, 1973 Japan................................ 48-61301
May 30, 1973 Japan................................ 48-61302
May 30, 1973 Japan................................ 48-61303
May 30, 1973 Japan................................ 48-61304

[52] U.S. Cl................................. 360/132; 360/85
[51] Int. Cl.²................ G11B 23/04; G11B 15/66
[58] Field of Search....................... 360/132, 85, 130

[56] References Cited
UNITED STATES PATENTS

3,510,605   5/1970   Ottens................................ 360/132
3,639,697   2/1972   Koguma.............................. 360/130

*Primary Examiner*—Robert S. Tupper
*Attorney, Agent, or Firm*—Stevens, Davis, Miller & Mosher

[57] ABSTRACT

A tape cassette for a helical scan type recording and reproducing apparatus comprising upper and lower cylindrical members capable of engaging with each other and adapted to accept a magnetic head therein, and movable poles connected with the upper cylindrical members and capable of stretching a tape outward to prevent contact with various parts of the recording and reproducing apparatus in loading and retrieving the tape cassette. The upper cylindrical member has a helical projection to engage with a helical groove formed in a support member so that it moves also vertically with the rotation thereof so as to expose the magnetic head and take up the tape.

4 Claims, 8 Drawing Figures

HELICAL SCAN TYPE TAPE CASSETTE HAVING TAPE THREADING MEANS

FIELD OF THE INVENTION

This invention relates to a tape cassette for a magnetic recording and reproducing apparatus of the helical scan type in which a magnetic tape is wound and run helically on a rotating magnetic head along the rotating trace of the head, being slanted by a certain angle, whereby signals are successively recorded on or reproduced from the tape with a certain angle slanted with respect to the longitudinal direction of the magnetic tape.

DESCRIPTION OF THE PRIOR ART

In magnetic recording and reproducing apparatus, assembling a magnetic tape in a cassette is convenient for loading and retrieving a tape into and from an apparatus and advantageous for the protection of a tape. Thus, various cassette type tapes are brought into practical use in magnetic recording and reproducing apparatus of the fixed head type.

In magnetic recording and reproducing apparatuses of the helical scan type, however, it is necessary to wind a magnetic tape at a predetermined angle around a cylindrical tape guide including a rotating magnetic head and a complicated mechanism is necessary in the main body of the recording and reproducing apparatus for this winding; therefore, assembling a tape in a cassette has been difficult.

Especially in a helical scan type recording and reproducing apparatus of one head structure, it is necessary to wind a magnetic tape helically for 360° along the rotational trace of the magnetic head and therefore, adaptation of the cassette system has been very difficult.

SUMMARY OF THE INVENTION

An object of this invention is to provide a tape cassette for a helical scan type recording and reproducing apparatus which does not require a complicated mechanism for winding a tape in a recording and reproducing apparatus.

Another object of this invention is to provide a tape cassette effective for use in one-head type recording and reproducing apparatus of a helical scan system.

DESCRIPTION OF THE PREFERRED EMBODIMENT

Figure 1:
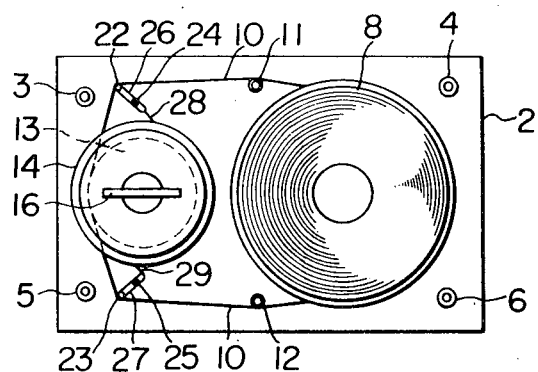
FIG. 1 is a plan view of an embodiment of the tape cassette according to this invention with an upper plate removed.
Figure 2:
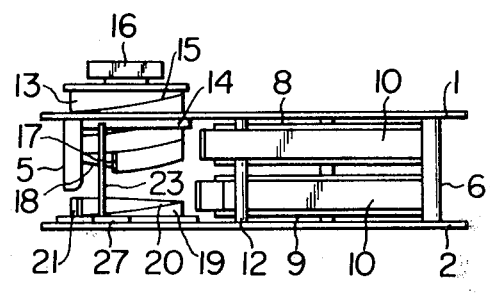
FIG. 2 is a partially cut-away side view of the tape cassette of FIG. 1.
Figure 3:
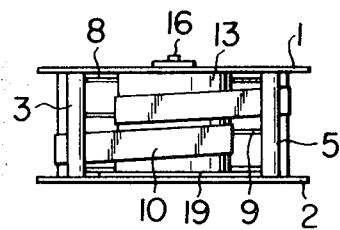
FIG. 3 is a front view of the tape cassette of FIGS. 1 and 2.

FIGS. 1, 2 and 3 show a tape cassette, FIG. 1 illustrating the cassette with its upper plate removed in FIG. 1. As shown in these figures, an upper plate 1 and a lower plate 2 are held separated by a certain gap with four support members 3, 4, 5 and 6. These supports 3 to 6 are hollow and have respective openings on the lower surface of the lower plate 2. Into these openings, pins projecting from the main body of a tape recorder, to be described later, are arranged to engage. Between the two plates 1 and 2, a supply reel 8 and a take-up reel are superposedly disposed to rotate independently in a manner similar to that of a conventional tandem type cartridge.

Figure 8:
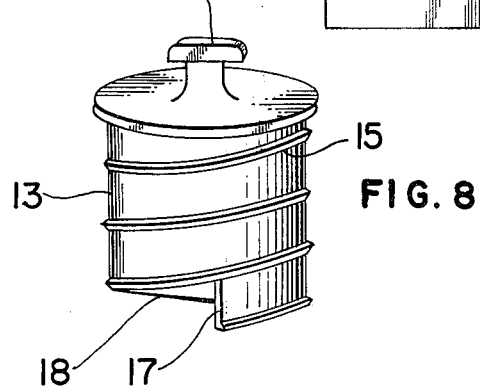
FIG. 8 is a schematic view showing the main parts of a tape cassette.

On these reels 8 and 9, a magnetic tape 10 is wound. Guide posts 11 and 12 guide the tape 10. A throughhole is provided in the upper plate 1 in which a support ring 14 is attached and provided with a groove on the inner surface for allowing the vertical motion of a cylindrical member 13. A helically projecting screw 15 to engage with the screw groove of the ring 14 is formed on the outer surface of the cylindrical member 13, as is shown in FIG. 8. The cylindrical member 13 can be moved up and down by rotating a knob 16 provided on the upper end of the cylindrical member 13. A stepped portion 17 is formed in the lower end portion of the cylindrical member 13. A uniform slope 18 is formed from the upper portion of this stepped portion 17 around the lower periphery of the cylindrical member 13 to the lower portion of the stepped portion 17. A through hole is formed in the lower plate in a portion registered with the cylindrical member 13. Around this through hole, a cylindrical member 19 to engage with said cylindrical member 13 is attached. On the top end of the cylindrical member 19, a slope 20 and a stepped portion 21 are formed to engage with the lower end of the other cylindrical member 13 (see FIG. 2). This cylindrical member 19 is rotatable for a certain angle and is energized to rotate in the counter-clockwise direction by a spring. Thus, when a force is applied in the clockwise direction, the cylindrical member 19 rotates in the clockwise direction up to the certain angle. Mobile poles 22 and 23 are provided on the lower plate 2 on the both sides of the cylindrical member 19. These mobile poles 22 and 23 are mounted on pivot levers 26 and 27 which are rotatable about supports 24 and 25 and provided on the lower plate 2. These levers 26 and 27 are energized by springs (not shown) in such a direction that the mobile poles 22 and 23 are driven to approach the cylindrical members 13 and 19. The other ends of the levers 26 and 27 are coupled with said cylindrical member 19 with wires 28 and 29. These wires 28 and 29 may be replaced with levers. A tape guide of a circular cylinder shape including a rotating head of the video tape recorder can penetrate into the insides of said cylindrical members 13 and 19 from a lower position. A magnetic tape 10 fed from the supply reel 8 is wound around the outer periphery of the cylindrical member 13 helically for one round through the guide post 12, and then taken up by the take-up reel 9 through the guide post 11.

Figure 4:
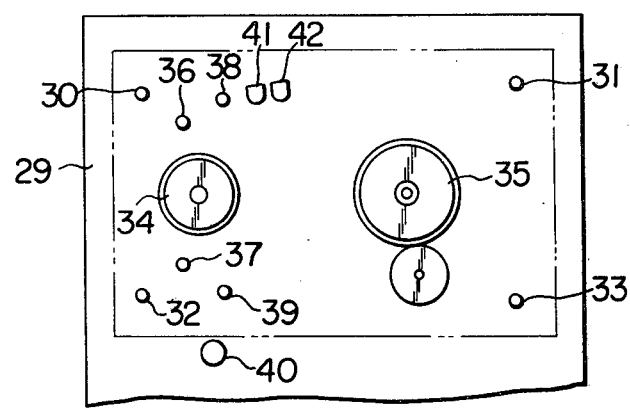
FIG. 4 is a plan view of the main body of a recording and reproducing apparatus.

Description will now be made of a main apparatus such as video tape recorder. As shown in FIG. 4, poles 30, 31, 32 and 33 are provided on a chassis 29, onto which the support poles 3 to 6 are superposed. A tape guide 34 of a circular cylinder shape including one rotating head and a reel table 35 for driving the reel in a cassette are provided on the chassis 29. Poles 36, 37 and 38 and a capstan 39 for guiding a tape are provided on the two sides of the tape guide 34. A pinch roller 40 is provided for this capstan 39. A record reproducing head 41 for the audio and control signals and an erasing head 42 are also shown.

Figure 5:
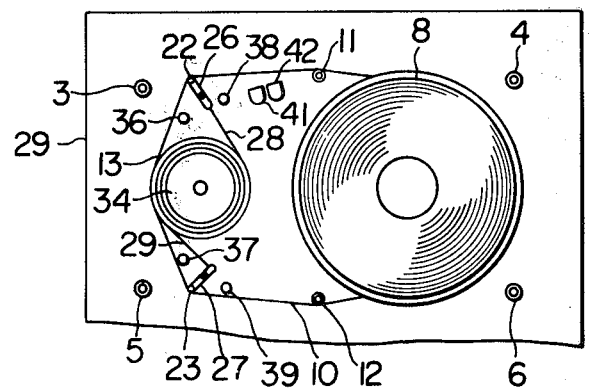
FIG. 5 is a plan view of a magnetic recording and reproducing apparatus loaded with a tape cassette according to this invention showing the positional relationships of a magnetic tape and various parts of the recording and reproducing apparatus.

The operation of these mechanisms will be described hereinbelow. In a cassette, the tape 10 is wound on the cylindrical members 13 and 19 as is shown in FIG. 3 and the cylindrical member 13 is entirely contained between the upper and the lower plates 1 and 2. When the cylindrical member 13 is energized to rotate in the clockwise direction through manipulation of the knob 16, since the stepped portions 17 and 21 of the cylindrical members 13 and 19 are engaged the cylindrical member 19 is applied with a force and rotated by a certain angle. When the manipulation of the knob 16 is released, the cylindrical member 19 holds its state. Since the spring force energizing the cylindrical member 19 in the counter-clockwise direction is not so strong, the cylindrical member 19 does not return to the original position even if the manipulation of the knob 16 is released. It is apparent that if the cylindrical member 19 is not engaged with the other cylindrical member 13 it returns to the original position. When the cylindrical member 19 is rotated by a certain angle in the clockwise direction, the wires 28 and 29 are pulled to rotate the levers 26 and 27 and the tape 10 is held stretched to the outside by the mobile poles 22 and 23. In this state, the cassette is loaded in a video tape recorder. Loading can be done by superposing the support poles 3 to 6 of the cassette onto the poles 30 to 33. FIG. 5 shows the state when a cassette is loaded in a video tape recorder. Since the tape 10 is pulled outwards by mobile poles 22 and 23, it is prevented from contacting the poles 36, 37 and 38, the capstan 39 and the heads 41 and 42. Here, there are provided through holes in the lower plate 2 in such positions that correspond to the poles 36, 37 and 38, the capstan 39 and the heads 41 and 42. The cylindrical members 13 and 19 cover the tape guide 34 and the reels 8 and 9 are mounted on the reel table 35.

Figure 6:
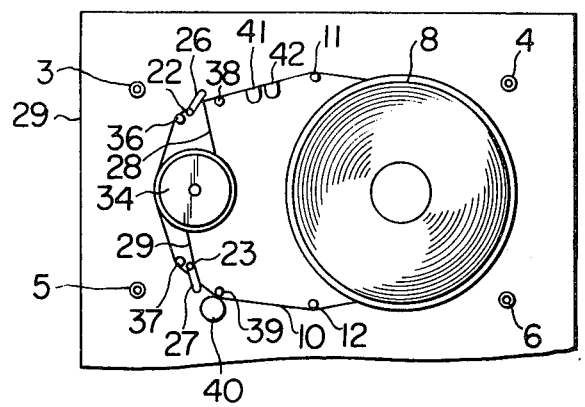
FIG. 6 is a plan view of a magnetic recording and reproducing apparatus showing the positional relationships and engagements of a magnetic tape and the various parts of the apparatus in reproducing a record.
Figure 7:
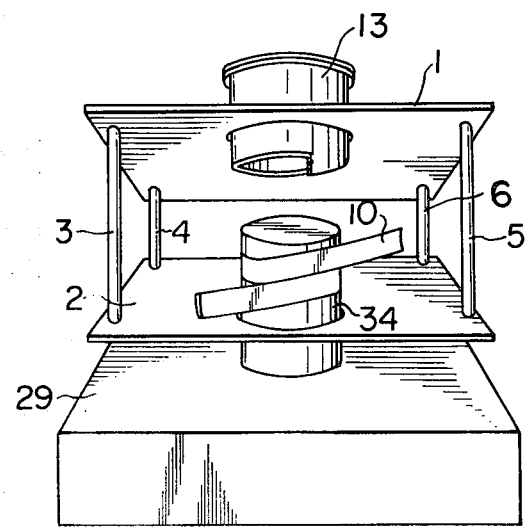
FIG. 7 is a schematic view showing the engagement of a tape cassette and the apparatus.

In this state, the cylindrical member 13 is rotated in the counter-clockwise direction by manipulating the knob 16. Then, the cylindrical member 13 rises above the upper plate 1, but the tape 10 remains under the upper plate 1 and is now wound around the tape guide 34. Since the engagement between the cylindrical members 13 and 19 is solved by the elevation of the cylindrical member 13, the cylindrical member 19 is allowed to rotate by the certain angle in the counter-clockwise direction and stops there. As a result, the levers 26 and 27 are rotated to release the mobile poles 22 and 23 from the tape 10 and thereby the tape 10 contacts the poles 36, 37 and 38, the capstan 39, and the heads 41 and 42, as is shown in FIG. 6. In this state, the recording and reproducing apparatus is ready to play. FIG. 7 shows the state in which the cylindrical member 13 is raised and the tape 10 is transferred around the tape guide 34 including a head.

Next, description will be made on the operation for retrieving the cassette from the video tape recorder when playing is over. When playing has finished, the cylindrical member 13 may be rotated by manipulating the knob 16 to drive the cylindrical member 13 downward. Then, the stepped portion 17 of the cylindrical member 13 goes between the tape 10 and the tape guide 34. Then the tape 10 is successively wound around the cylindrical member 13 by the rotation of the member 13. By completely taking up the tape and further rotating the cylindrical member 13 to rotate the other cylindrical member 19 by a certain angle so as to support the tape 10 with the poles 22 and 23, the tape 10 is released from the poles 36, 37 and 38, the capstan 39, and the heads 41 and 42. In this state, the cassette can be retrieved from the video tape recorder.

In the above embodiment, a projecting screw 15 was formed helically on the outer surface of the cylindrical member 13. The vertical movement of the cylindrical member 13 can also be achieved by forming a concave groove on the member 13 and a projecting screw on the support ring. However, when a projecting screw 15 is provided on the cylindrical member 13 and the pitch of the projecting screw 15 is set to a width in which a tape 10 can be contained, taking-up of the tape 10 can be done effectively. Namely, contact between the lower edge of the upper tape and the upper edge of the lower tape wound around the cylindrical member 13 is prevented to eliminate possible damage to the edge of the tape.

Although only one head was provided in the tape guide 34 in the above embodiment, this invention is similarly applicable to those having a rotating head including a plurality of heads.

As has been described above, according to this invention a cassette tape can be used also in a video tape recorder having only one head and since the pitch of a projecting screw provided on the cylindrical member is of such a width as to contain a tape therein the tape is free from damage and can be smoothly transferred onto a rotating head.

What is claimed is:
1. A tape cassette for use with a main tape recording apparatus having a tape guide of a circular cylindrical shape housing a rotating head, comprising:
   a. an upper plate and a lower plate each having a through hole;
   b. support members, connecting said upper plate and said lower plate with a predetermined gap between said upper and lower plates to form an inner space therebetween, said support members connecting said upper and lower plates to align the through holes;
   c. a first rotatable cylindrical member consisting of a single cylinder and having a hollow opening facing said lower plate for accomodating the tape guide;
   d. holding means for rotatably holding said first cylindrical member on said upper plate to enable said first cylindrical member to freely enter and exit said inner space through said through hole in said upper plate on rotation of said first cylindrical member, said through hole in said lower plate being positioned such that the tape guide is introduced into said inner space through said lower plate through hole when the tape cassette is mounted on the main tape recording apparatus;
   e. a supply reel and a take-up reel respectively rotatably connected in said inner space to one of said upper and lower plates; and f. a magnetic tape fed from said supply reel, wound helically on said single cylinder and taken up by said take-up reel, said single cylinder including on its outer surface a helical projection having a pitch approximately equal to the width of the magnetic tape, said holding means including a support ring, around said upper plate through hole, having a screw groove to engage said helical projection.

2. The tape cassette according to claim 1, further comprising:
   a. a second rotatable member provided in the vicinity of said through hole in said lower plate and being rotatably engageable with said first cylindrical member by the rotation of said first member;
   b. means rotatably mounting said second rotatable member on said lower plate;
   c. levers on two sides of said lower plate through hole;
   d. poles provided on said levers, respectively, and engageable with said magnetic tape,
   e. means pivotally mounting said levers to move said poles to and away from said second member; and
   f. means for transmitting the rotation of said second member to said levers, wherein said levers are rotated by the rotation of said second member to move said poles away from said second member.

3. A tape cassette according to claim 1, wherein said first cylindrical member has a stepped portion in a lower end portion, and the direction of rotation in which said first cylindrical member moves into said inner space coincides with the direction in which the tape is wound around said single cylinder.

4. A tape cassette according to claim 1, wherein said supply reel is disposed coaxially with and above said take-up reel.

* * * * *